US009049166B2

(12) United States Patent
Shaw

(10) Patent No.: US 9,049,166 B2
(45) Date of Patent: *Jun. 2, 2015

(54) SYSTEM AND METHOD FOR MESSAGING CONTENT DELIVERY

(71) Applicant: AT&T Mobility II LLC, Atlanta, GA (US)

(72) Inventor: Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 34 days.

This patent is subject to a terminal disclaimer.

(21) Appl. No.: 13/916,004

(22) Filed: Jun. 12, 2013

(65) Prior Publication Data

US 2013/0275538 A1 Oct. 17, 2013

Related U.S. Application Data

(63) Continuation of application No. 12/621,997, filed on Nov. 19, 2009, now Pat. No. 8,489,130.

(51) Int. Cl.
*H04W 4/00* (2009.01)
*H04L 12/58* (2006.01)
*H04M 3/53* (2006.01)
*H04W 4/12* (2009.01)

(52) U.S. Cl.
CPC ............ *H04L 51/36* (2013.01); *H04L 12/589* (2013.01); *H04L 12/5895* (2013.01); *H04M 3/5307* (2013.01); *H04M 2203/4509* (2013.01); *H04W 4/12* (2013.01)

(58) Field of Classification Search
CPC ... H04L 51/36; H04L 12/589; H04L 12/5895; H04W 4/12; H04W 4/14; H04W 88/184; H04M 3/5307; H04M 2203/4509; H04M 1/72552; G06Q 10/107
USPC ............ 455/412.2, 414, 414.4, 412.1, 414.1, 455/414.2, 413, 466; 379/67.1, 88.13, 379/88.22, 88.17; 709/206, 225, 202, 203
See application file for complete search history.

(56) References Cited

U.S. PATENT DOCUMENTS

| 6,510,429 | B1 | 1/2003 | Todd | |
|---|---|---|---|---|
| 7,233,648 | B2 | 6/2007 | Pearson | |
| 7,346,150 | B2 * | 3/2008 | Frifeldt et al. | 379/88.12 |
| 8,489,130 | B2 * | 7/2013 | Shaw | 455/466 |
| 2004/0131081 | A1 * | 7/2004 | Bhatia et al. | 370/466 |
| 2004/0254993 | A1 * | 12/2004 | Mamas | 709/206 |
| 2006/0112400 | A1 * | 5/2006 | Zhang et al. | 719/328 |
| 2006/0281474 | A1 * | 12/2006 | Domville et al. | 455/466 |
| 2008/0052070 | A1 | 2/2008 | Doulton | |

(Continued)

OTHER PUBLICATIONS

"An Open, Modular, Scalable System For The Delivery Of Converged Communications," Solution White Paper, © 2008, 4 pages.

(Continued)

*Primary Examiner* — Mahendra Patel
(74) *Attorney, Agent, or Firm* — Baker & Hostetler LLP

(57) ABSTRACT

An integrated system for messaging content delivery for use in a wireless network that incorporates a messaging application broker that interfaces with messaging applications; management applications, a plurality of user devices, and external networks. The interfaces use the appropriate protocols to interact with the messaging applications, management applications, user devices and external networks.

19 Claims, 8 Drawing Sheets

(56) References Cited

U.S. PATENT DOCUMENTS

2008/0113679 A1* 5/2008 Sung et al. .................... 455/466
2008/0248788 A1* 10/2008 Smith et al. ................ 455/414.3

OTHER PUBLICATIONS

"Overview of GPRS," Cisco IOS Mobile Wireless Configuration Guide, Jan. 18, 2008, 4 pages.

"Unleashing The Value In Messaging Services," Alcatel-Lucent 5150 Messaging Broker, © 2009, 12 pages.

Badulescu, et al., "Delivering The Optimal End-User Experience: Ericsson Multimedia Communication Suite," Ericsson Review No. 2, 2008, 52-57.

Cataldo, "Open Mobile Alliance, Converged IP Messaging—Integrating Multiple Communications Platforms, Multiple Devices and Existing Standards for Global Interoperability," Future of Mobile Messaging, Budapest, Mar. 31, 2008, 21 pages.

* cited by examiner

SYSTEM AND METHOD FOR MESSAGING CONTENT DELIVERY

CROSS REFERENCE TO RELATED APPLICATIONS

The instant application is a continuation of, and claims priority to, U.S. patent application Ser. No. 12/621,997, filed Nov. 19, 2009. U.S. patent application Ser. No. 12/621,997 is incorporated herein by reference in its entirety.

TECHNICAL FIELD

The invention pertains generally to a system and method for messaging content delivery, and more specifically to a system and method for managing the delivery of messaging content, including voicemail, MMS, SMS, IM, email, and the like using a integrated messaging broker.

BACKGROUND

Messaging has become prevailing communications method in the consumer and enterprise markets. Existing technology provides mobile device users with a variety of ways of messaging, including Short Message Service (SMS), Instant Messaging (IM), e-mail, voice mail (VM), Visual Voice Mail (V-VM), and multimedia messaging services (MMS). SMS is a messaging service first utilized in the Global System for Mobile Communications (GSM). SMS uses communications protocols developed in accordance with a standard to provide the interchange of short text messages between mobile devices. IM is a technology that provide the capability of real-time text-based communication between two or more participants in a network. IM can be utilized over the Internet with other network E-mail, is a method of exchanging digital messages using a server to accept, forward, deliver and store messages for users. VM is a method of messaging where a user can record a voice message on a server that can be accessed by the recipient of the message using a telephone. Voicemail stores messages in mailboxes associated with the recipient's phone number. Messages may be forwarded, stored, and saved. Some systems now add the capability of providing text associated with the voicemail. This capability includes providing the user with a list of voicemail messages, or converting to voice message into text through the use of speech recognition systems. MMS, allows a user to send a message that includes images, audio, video, or rich text. MMS utilizes the Wireless Application Protocol (WAP) to display the content. MMS can be used to share photographs, audiovisual files, and the like.

Current systems come with individual solution to deliver each messaging solution such as SMS, MMS, Voice Message, IM, email. Accordingly, network operators and service providers world wide have to develop multiple solutions for each of the messaging applications which is ineffective and expensive. As the messaging technology evolved, telecommunication carriers develop infrastructures to individually support each messaging solution, which is inefficient and expensive. Consequently, network operators and service providers have developed multiple solutions for each of the messaging applications.

Accordingly, there is a need to develop a network infrastructure where a single solution can process all of the available messaging applications. There is a need to develop a single platform that can handle all of the available messaging applications. There is a need for a single architecture to support generalized content delivery for both wireline and wireless networks.

SUMMARY

An aspect of the present invention is to deliver a unified architecture that allows a single solution to deliver multiple messaging applications including voice messaging, video messaging, MMS, SMS, IM, email, etc. which is scalable, cost efficient, and high performance.

Another aspect of the present invention is to provide a single solution to deliver multiple messaging applications that can used by both wireline and wireless networks.

In one embodiment a messaging application broker is provided in a wireless network. The messaging application broker interfaces with at least one messaging application. The messaging application broker also interfaces with the wireless network management applications, user devices, and external networks.

In another embodiment a messaging application broker is provided in a wireless network. The messaging application broker interfaces with converged messaging system. The messaging application broker also interfaces with the wireless network management applications, user devices, and external networks.

A method of processing a message is also provided wherein the message is stored a converged messaging system. The converged messaging system notifies a messaging application broker that determines the services available to the intended recipient of the message. The messaging application broker selects the network element through which the message notification will be communicated to the message recipient based on the type of message and services available to the intended recipient of the message.

BRIEF DESCRIPTION OF THE DRAWINGS

The foregoing summary, as well as the following detailed description of illustrative embodiments, is better understood when read in conjunction with the appended drawings. For purposes of illustrating the invention, there is shown in the drawings example constructions of the invention; however, the invention is not limited to the specific methods and instrumentalities disclosed. Various exemplary embodiments of this invention will be described in detail, with reference to the following Figures, wherein like numerals represent like elements, and wherein.

DETAILED DESCRIPTION OF ILLUSTRATIVE EMBODIMENTS

Figure 1:
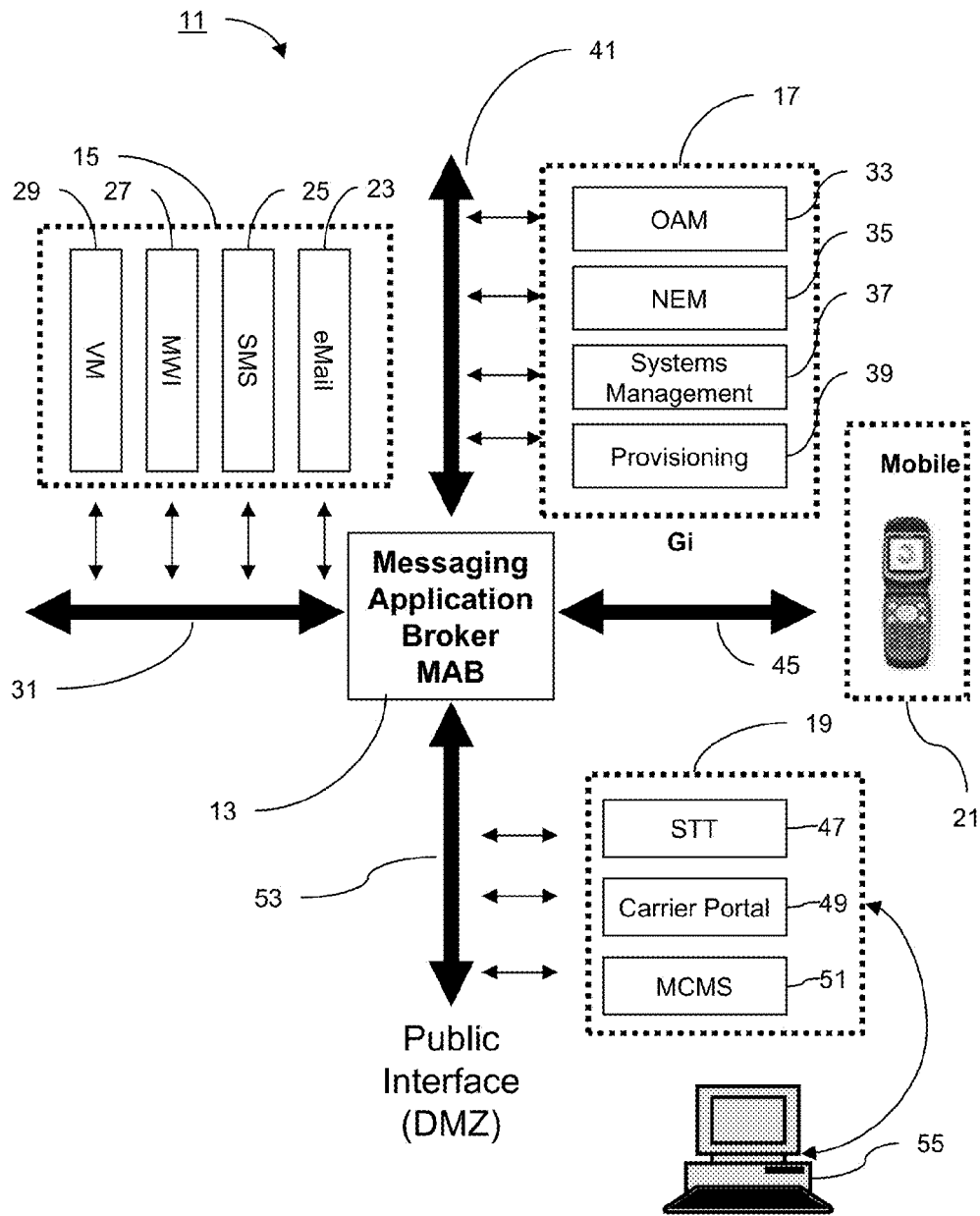
FIG. 1 is a block diagram of a non-limiting, exemplary system for messaging content delivery.

Illustrated in FIG. 1 is an embodiment of the system for messaging content delivery 11 in accordance with the present disclosure. The system includes a messaging application broker 13, that is coupled to a set of messaging applications 15, a set of network management applications 17, a set of external networks 19 and a plurality of user devices 21, such as for example mobile devices or computers.

The set of messaging applications 15 may include e-mail applications 23, SMS applications 25, a message waiting indicator application 27, a voicemail application 29 and other applications for processing different types of messages such as MMS, visual voice mail, instant messaging, and the like. The messaging applications 15 are coupled to the messaging application broker 13 through an internal application interface 31. The e-mail application 23 interacts with a. e-mail system that may include an Simple Mail Transfer Protocol (SMTP) server for handling outgoing e-mail. A second server may be used for handling in-coming e-mail. The second server may be a Post Office Protocol (POP) server or an Internet Mail Access Protocol (IMAP) server. The SMS application 25 interacts with an SMS system that may include an SMS Center (SMSC) that provides a store and forward function in a centralized system in a mobile telephone network. Typically, an SMS message passes through an SMSC and an SMS gateway before reaching the user. An SMSC routes the SMS messages and regulate the process. If the receiving user is unavailable the SMSC will store the SMS message until the receiving user is available. The message waiting indicator application 27, interacts with a Message Waiting Indicator (MWI) system. The MWI System notifies the receiving user that a message is waiting. The MWI system will typically include an MWI server that provides a receiving user an indication that a message is waiting. The voicemail application 29 interacts with a voicemail server. The voicemail application 29 provides that message retrieval functionality for the receiving users.

The set of network management applications 17 may include an operations administration and management tool 33 used to monitor, troubleshoot, and optimize performance the network. The set of network management applications 17 may also include a network estimate module 35 used to communicate information between multiple nodes (e.g. wireless nodes). A system management application 37 may also be included in the set of network management applications 17. The system management application 37 is used to gather information from a variety of network applications and devices and provides network administrators with the necessary information to manage the network. Yet another type of management application may include a provisioning application 39 used to configure systems and provide users with access to data and resources. The set of network management applications 17 are coupled to the messaging application broker 13 through a management interface 41. Typical protocols used in the management interface include XML Configuration Access Protocol (XCAP) and Lightweight Directory Access Protocol, (LDAP).

A plurality of user equipment, devices or mobile devices 21 may be connected to the messaging application broker 13 through a user equipment interface 45. The user equipment interface 45 may be a Gi interface that is a general packet radio services interface which is located between the a gateway general. support node and the user devices A typical protocol for the user equipment interface is hypertext transfer protocol (HTTP).

The external network 19 may include a hosted network 47 that provides speech to text (STT) functionality. The external network 19 may also include a carrier portal that provides access to information from a variety of sources as well as search engine and e-mail functionality. An example of a carrier portal is ATT.net. The external networks 19 may include a mobile content management system 51 that provides users with the ability to store content such as videos, photographs, and the like. The mobile content management system 51 provides a single point from where users can access all of their content. An example of a mobile content management system is OnePlace. The external network 19 is connected to the messaging application broker through a public interface 53. The public interface 53 provides a physical or logical interface to a larger untrusted network, usually the Internet. The public interface 53 may also referred to as the DMZ and is provided as an additional layer of security to the carrier's network. The external network may be accessed by a user through a user device 55, such as a computer. A typical protocol for the public interface may be the Hypertext Transfer Protocol Secure (HTTPS) protocol.

The configuration of the system for messaging content delivery 11 provides an integrated system. The integration of the system for messaging content delivery is accomplished through the use of the messaging application broker 13 that (1) provides the interface 31 between the messaging application broker 13 and the messaging applications 15; (2) provides the management interface 41 between the messaging application broker 13 and the management applications 17; (3) provides a Gi interface 45 between the messaging application broker 13 and the user devices 21; and (4) provides a public interface 53 between the messaging application broker 13 and the external networks 19.

Figure 2:
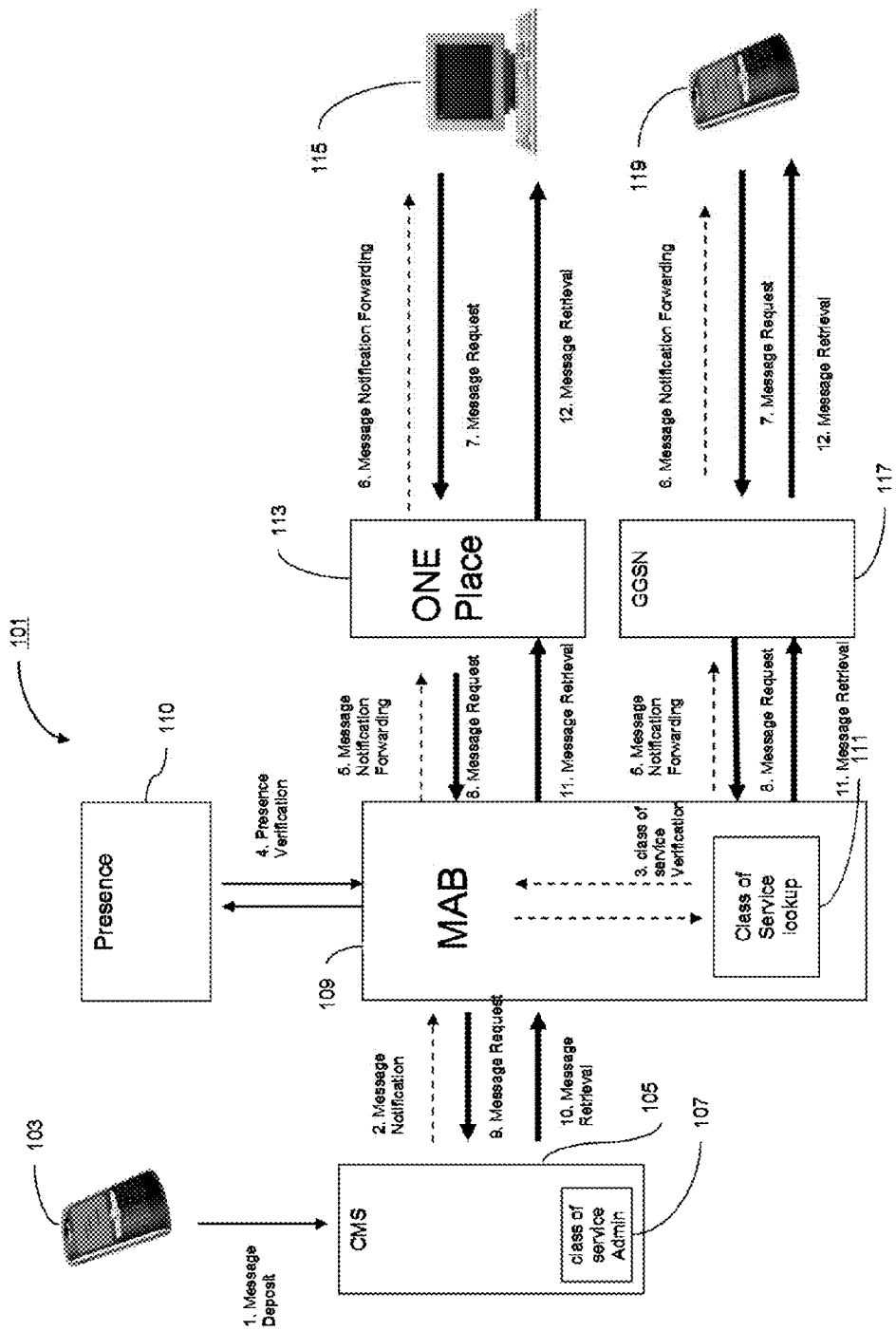
FIG. 2 is a block diagram of an alternate embodiment of a non-limiting, exemplary system for messaging content delivery.

Illustrated in FIG. 2, is another embodiment of a system for messaging content delivery 101. In this embodiment a mobile device 103 may deposit a message on a converged messaging system (CMS) 105 that includes a class of service administration functionality 107. The CMS 105 processes each type of message as a service. The CMS 105 may be a server that provides multiservice protocol conversion that enables the inter-working between different messaging protocols. The CMS 105 provides a message notification to a messaging application broker 109 that includes a class of service lookup application 111 used to verify the class of service. The messaging application broker 109 interacts with a presence server 110 to verify presence. The messaging application broker 109 may then forward the message to a mobile content management system 113. The mobile content management system then forwards a message notification to the user. The mobile content management system may be used by a wireline user computer 115 to retrieve messages. The wireline user computer 115 may request the message through the mobile content management system 113. The message request is relayed to the messaging application broker 109 and is then routed to the CMS 105. The appropriate messages are identified and then forwarded from the CMS 105 to the messaging application broker 109. The messaging application broker 109 then transmits the message to the wireline user computer 115 through the mobile content management system 113.

If the receiving user is a wireless mobile device 119 access to the messages is provided through a Gateway GPRS support node (GGSN) 117. In this case a message from mobile device 103 is deposited in the CMS 105. The messaging application broker 109 is notified of the message and messaging application broker 109 performs a class of service verification using the class of service lookup application 111. The messaging application broker 109 then communicates with the presence server 110 to verify presence. The message notification is provided through GGSN 117 to the mobile device 119. The user of the mobile device 119 may retrieve the message by sending a message request through the GGSN 117 to the messaging application broker 109. The message retrieval request is routed to the CMS 105. The CMS 105 routes be retrieved message through the messaging application broker 109 and the GGSN 117 to the mobile device 119.

Figure 3:
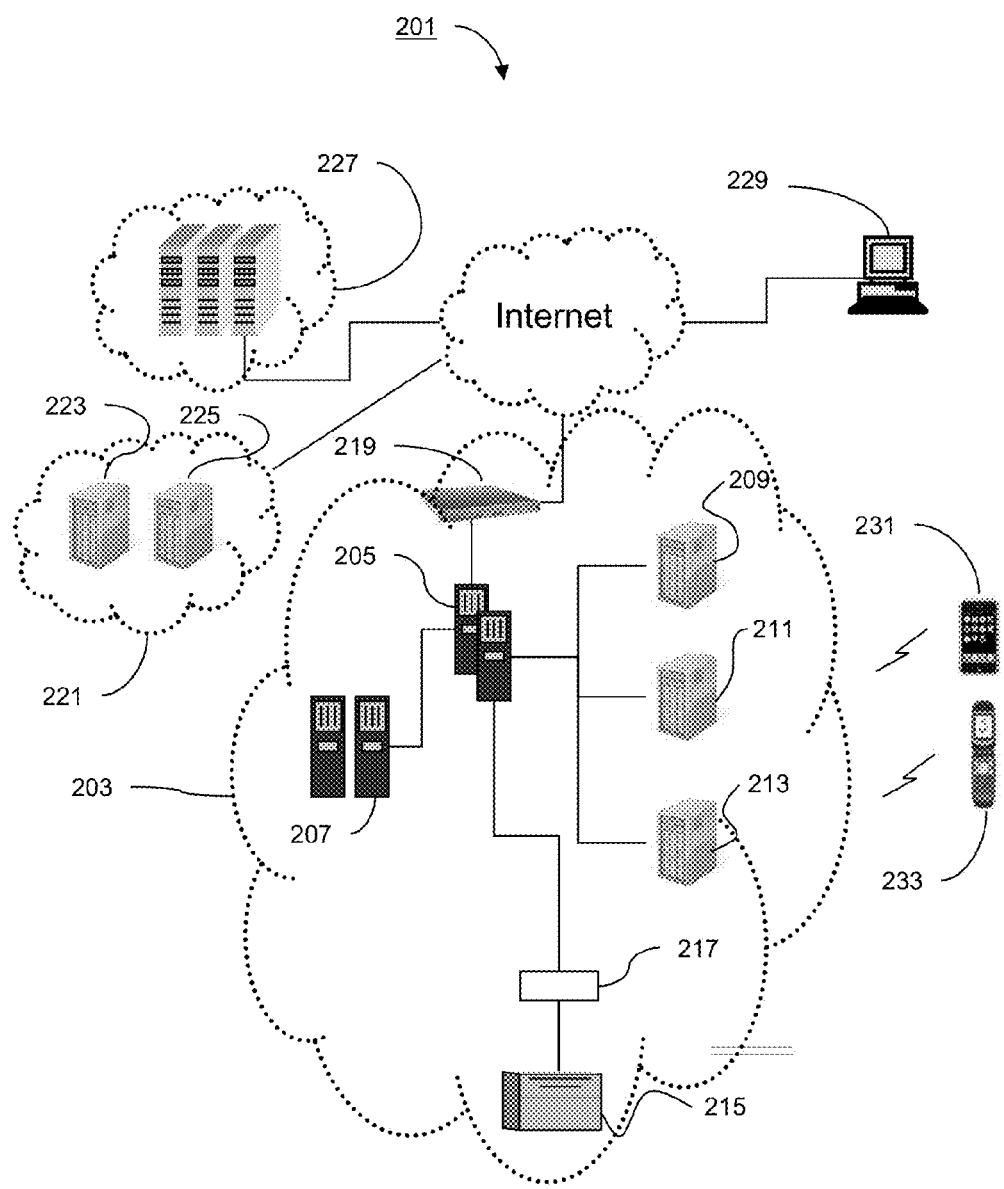
FIG. 3 is a block diagram of an alternate embodiment of a non-limiting, exemplary system for messaging content delivery.

Illustrated in FIG. 3 is an alternate embodiment of a system for messaging content delivery 201. The system for messaging content delivery includes a mobile network 203. In the mobile network there is a messaging application broker 205 and a CMS 207. The system for messaging content delivery 201 also includes network elements such as a Gateway GPRS node 209, a short messaging service center 211, a message waiting indicator server 213, and a master IT and network database (MIND) 215.) The MIND 215 provides subscriber information to other network elements for routing messages validation of services, and enabling other data services. The messaging application broker 205 communicates with the MIND database 215 through a messaging bridge 217. The messaging application broker 205 can communicate with the Internet through a message transfer agent 219. Illustrated in FIG. 3 is a carrier portal network 221 that may include an event notifier 223 and a services access server 225. Also illustrated in FIG. 3 is an external hosted network 227. Users can interact with the system for messaging content delivery 201 through a computer 229, or mobile devices 231 and 233. The flexibility and utility of the system for messaging content delivery 201 can be illustrated with a description of how the system for messaging content delivery 201 handles a voice-mail or visual voicemail message and a voice mail to text message.

When the user records a voicemail message to be delivered to a mobile device 231 having visual voice mail functionality, the message is deposited in the CMS 207. Notification that the message has been deposited is sent to the messaging application broker 205. Typically the notification will be in Short Message Service (SMS) protocol or Short Message Peer to Peer protocol (SMPP). The messaging application broker 205 then sends a notification to the mobile device 231 through the message waiting indicator server (MWI) 213. Communications of the notification from the messaging application broker 205 to the MWI 213 will typically be in SMS or SMPP protocol. The mobile device 231 can be used to request the message through the Gateway GPRS node 209. The message request is typically in hypertext transfer protocol (HTTP) and is communicated through messaging application broker 205 to the CMS 207 using internet message access protocol (IMAP) or the light weight directory access protocol (LDAP). The CMS 207 transmits the retrieved message through the messaging application broker 205 to the Gateway GPRS node 209 and ultimately to the mobile device 231. Alternately, the message may be accessed by a computer 229 through a message transfer agent 219. Communications between the computer 229 and the messaging application broker 205 would typically use a simple object access protocol (SOAP) and may be encoded in extensible markup language (XML).

In the case of a mobile device 233 having voice to text services, a message is deposited in the CMS 207. Notification of the message is sent to the messaging application broker 205 which communicates with event notifier 223 and services access server 225. Conversion of the message from voice to text is handled through the messaging application broker 205 communicating with the hosted network 227 that provides a voice to text conversion. The converted message is communicated through the messaging application broker 205 to the CMS 207. The CMS then directs the converted message through the short messaging service center to the mobile device 233.

Figure 4:
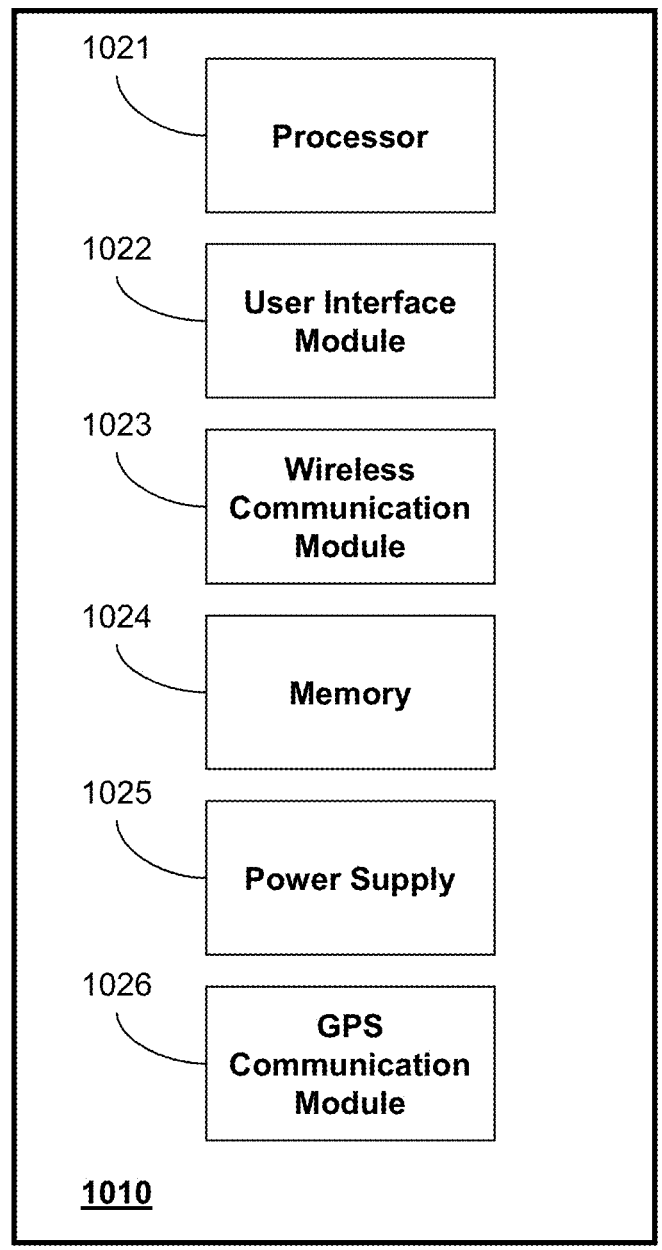
FIG. 4 is a block diagram of a non-limiting, exemplary wireless device that may be used in connection with an embodiment.

FIG. 4 illustrates an example wireless device 1010 that may be used in connection with an embodiment. References will also be made to other Figures of the present disclosure as appropriate. For example, device 102 may be a wireless device of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to constructing, transmitting, receiving messages such as SMS and MMS messages, operating an address book, and determining alternate addresses, for example. User interface module 1022 may be any type or combination of hardware and/or software that enables a user to operate and interact with wireless device 1010, in one embodiment, to compose and read messages. For example, user interface module 1022 may include a display, physical and "soft" keys, voice recognition software, microphone, speaker and the like. Wireless communication module 1023 may be any type or combination of hardware and/or software that enables wireless device 1010 to communicate with, for example, network 103 or any other type of wireless communications network. Memory 1024 enables wireless device 1010 to store information, such as an address book, contacts information, or the like. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010.

GPS communication module 1026 may be any type or combination of hardware and/or software that enables wireless device 1010 to communicate with GPS location equipment. In one embodiment, wireless communication module 1023 may perform the functions of GPS communication module 1026. In an alternative embodiment, GPS communication module 1026 may be separate from wireless communication module 1023.

Figure 5:
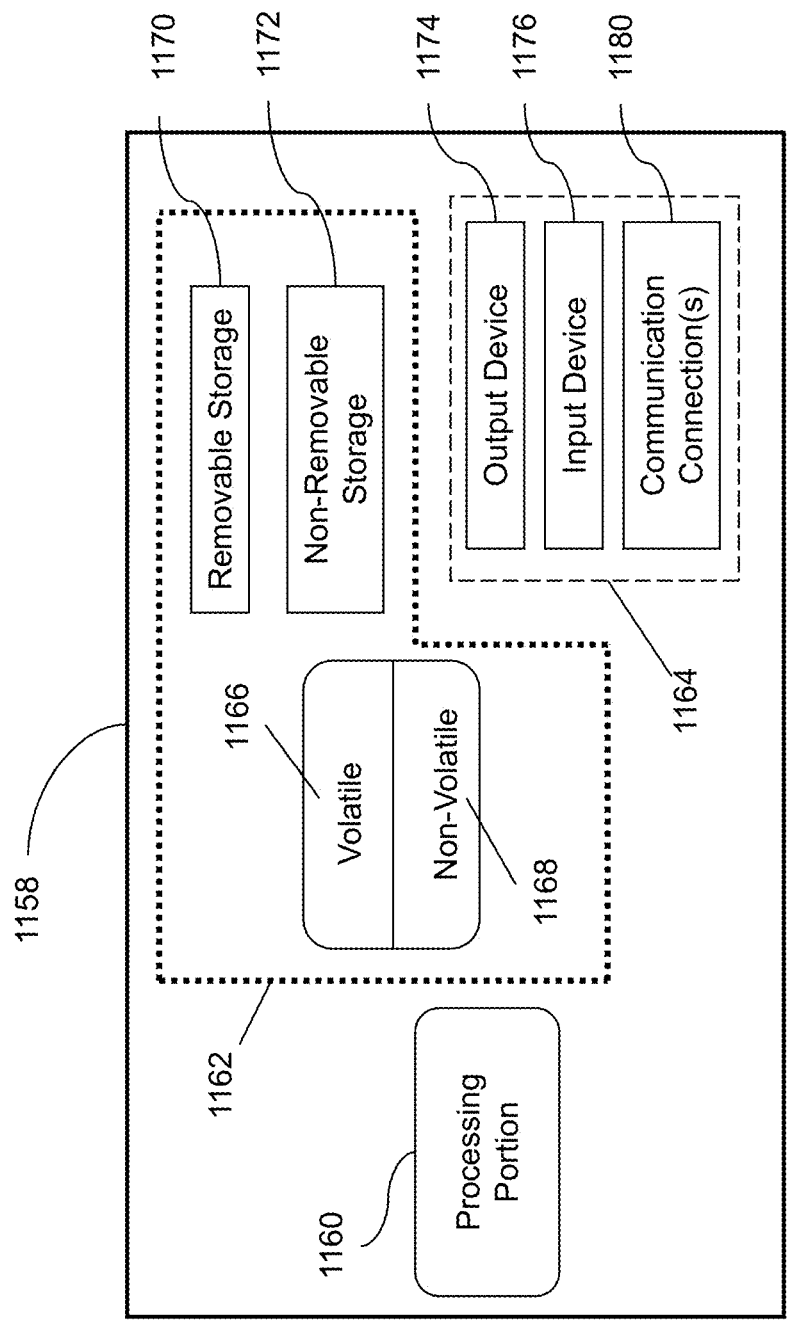
FIG. 5 is a block diagram of a non-limiting, exemplary processor in which the present subject matter may be implemented.

FIG. 5 is a block diagram of an example processor 1158 which may be employed in any of the embodiments described herein, including as one or more components of a communications device such as device 102 which may be a wireless communications device, as one or more components of communications network equipment or related equipment, such as any component of network 103, and/or as one or more components of any third party system or subsystems that may implement any portion of the subject matter described herein.

It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 560, memory portion 562, and input/output portion 1164 are coupled together (coupling not shown in FIG. 5) to allow communications between these portions. The input/output portion 1164 is capable of providing and/or receiving components utilized to, for example, transmit/receive messages and/or transmit/receive data for an address book or contact list.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing messages, contact information and numbers, determining alternate contacts, etc. For example, as described above, the memory portion is capable of storing an address book and software capable of operating the address book and determining alternate numbers. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network 103. Communications connection(s) 1180 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Network 103 may comprise any appropriate telephony radio network, or any other type of communications network, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how IP cellular broadcast may be used with stationary and non-stationary network structures and architectures. It can be appreciated, however, that systems for providing user names for network addresses such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the techniques of the utilization of SMS, MMS, and/or cellular broadcast can be applied independently of the method of data transport, and do not depend on any particular network architecture, or underlying protocols.

Figure 6:
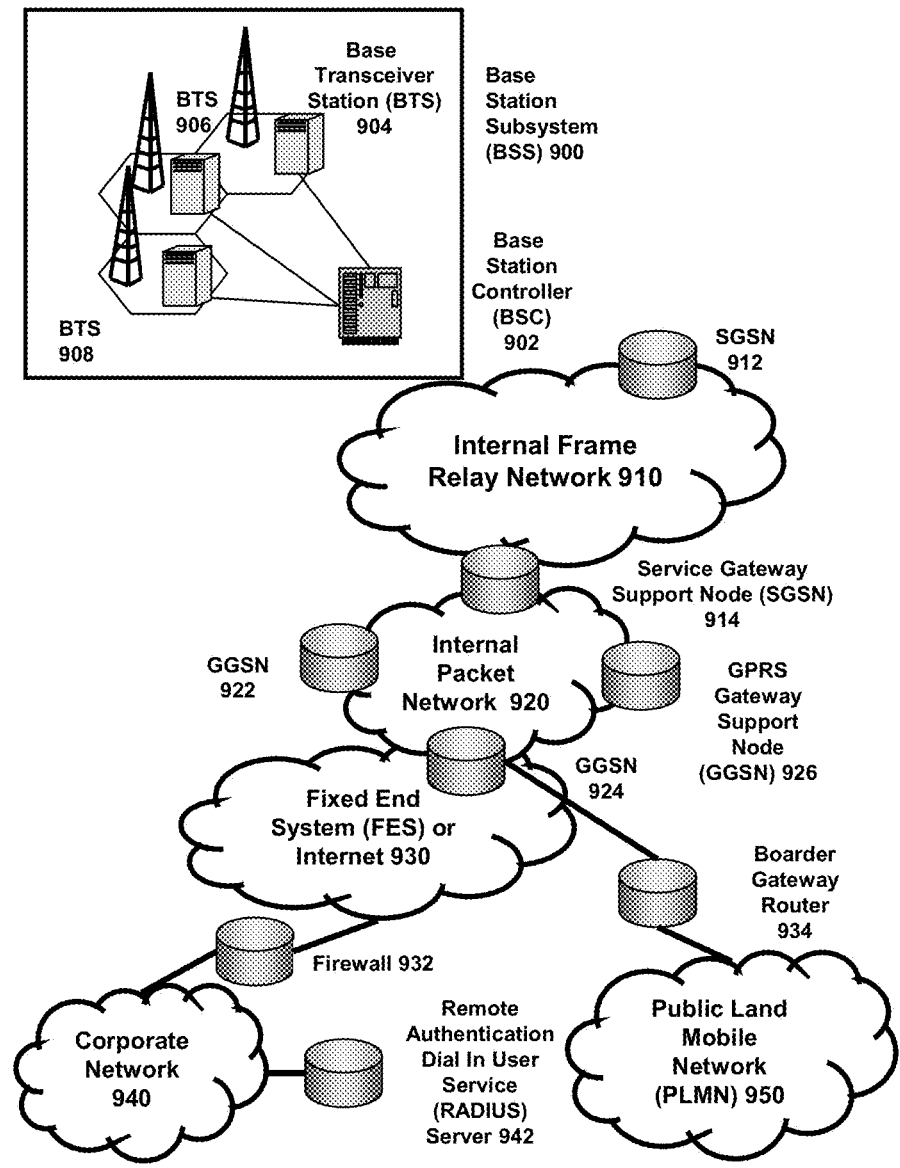
FIG. 6 is an overall block diagram of an exemplary packet-based mobile cellular network environment, such as a GPRS network, in which the present subject matter may be implemented.

FIG. 6 depicts an overall block diagram of an exemplary packet-based mobile cellular network environment, such as a GPRS network, in which systems providing user names for network addresses such as those described herein can be practiced. In an example configuration, network 103 may be encompassed by the network environment depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., device 102) become connected to the wireless network. In exemplary fashion, the packet traffic originating from user devices (e.g., device 102 and device 104) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932; and PLMN 950 may be connected to GGSN 924 via boarder gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
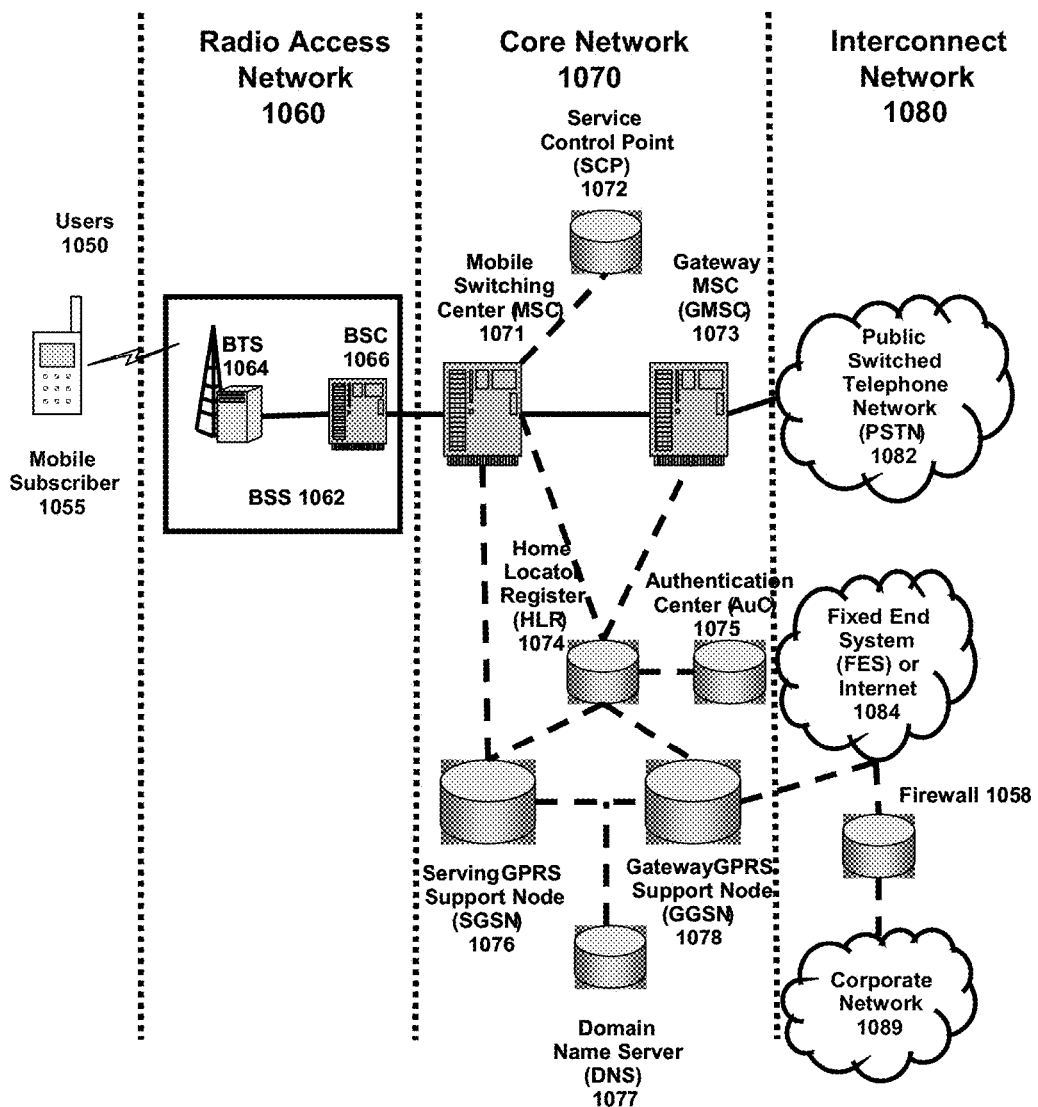
FIG. 7 illustrates a non-limiting, exemplary architecture of a typical GPRS network as segmented into four groups.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise device 102 and/or device 104. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as device 102, used by an end user of the mobile cellular service. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of message systems and methods for providing user names for network addresses such as those described herein can include but are not limited to Gateway GPRS Support Node tables, Fixed End System router tables, firewall systems, VPN tunnels, and any number of other network elements as required by the particular digital network.

Figure 8:
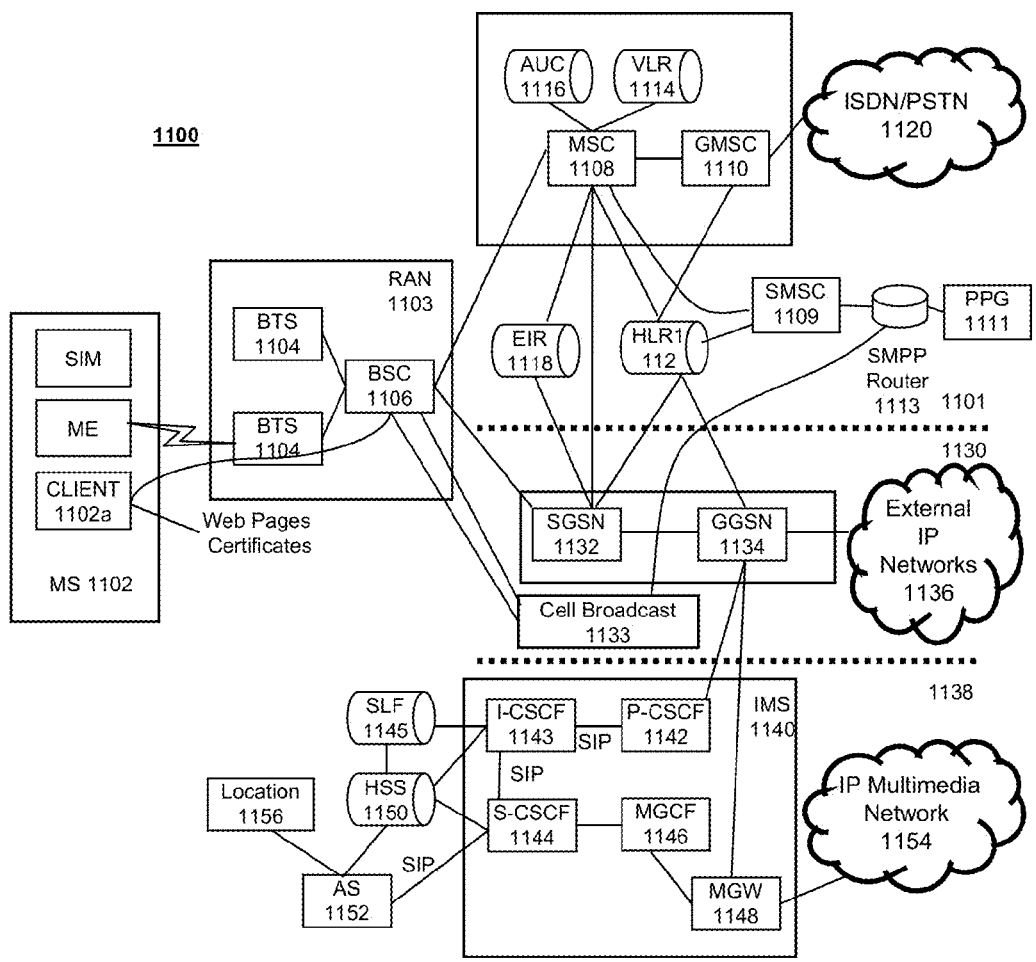
FIG. 8 illustrates a non-limiting alternate block diagram of an exemplary GSM/GPRS/IP multimedia network architecture in which the present subject matter may be implemented.

FIG. 8 illustrates another exemplary block diagram view of a GSM/GPRS/IP multimedia network architecture 1100 in which systems providing user names for network addresses such as those described herein can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., device 102) that is used by mobile subscribers, with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include address book data and/or message forwarding preferences for each subscriber. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain address book data and/or message forwarding preferences for each subscriber. The HLR 1112 and the VLR 1114, together with the MSC 1108, may provide the call routing and roaming capabilities of GSM, as well as message forwarding functionality. The AuC 1116 may provide the properties needed for authentication and encryption functions. Such properties allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a property in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

While example embodiments systems and methods providing user names for network addresses such as those described herein have been described in connection with various computing devices/processors, the underlying concepts can be applied to any computing device, processor, or system capable of implementing the systems and methods for providing user names for network addresses described. The various techniques described herein can be implemented in connection with hardware or software or, where appropriate, with a combination of both. Thus, the methods and apparatuses for the systems and methods for providing user names for network addresses, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for a system for providing user names for network addresses. In the case of program code execution on program messaging application broker computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for providing user names for network addresses as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a program messaging application broker logic device (PLD), a client computer, or the like, the machine becomes an apparatus a message forwarding system. When implemented on a general-purpose processor, the program code combines with the processor to provide a unique apparatus that operates to invoke the functionality of a message forwarding system. Additionally, any storage techniques used in connection with a message forwarding system can invariably be a combination of hardware and software.

While the systems and methods for providing user names for network addresses have been described in connection with the various embodiments of the various Figures, it is to be understood that other similar embodiments can be used or modifications and additions can be made to the described embodiments for performing the same function message forwarding without deviating from the described systems and methods. For example, one skilled in the art will recognize that a system providing user names for network addresses as described in the present application may apply to any environment, whether wired or wireless, and may be applied to any number of such devices connected via a communications network and interacting across the network. Therefore, systems providing user names for network addresses such as those described herein should not be limited to any single embodiment, but rather should be construed in breadth and scope in accordance with the appended claims. These and other changes can be made to the invention in light of the above detailed description. In general, in the following claims, the terms used should not be construed to limit the invention to the specific embodiments disclosed in the specification and the claims, but should be construed to include all networked digital messaging systems that operate under the claims. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:

1. A system for applications involving various protocols comprising:
    an application subsystem in a converged messaging system comprising:
        an email application;
        an SMS application;
        a voice mail application;
        an MMS application;
        a visual voice mail application; and
        an instant messaging application;
    a management subsystem comprising:
        an operations and management tool for monitoring, troubleshooting, and optimizing performance of a network;
        a network estimation module for communicating information between multiple wireless nodes;
        a system management application for:
            gathering information from a plurality of network applications devices; and
            providing network administrators with information to facilitate managing the network; and
        a provisioning application for:
            configuring systems; and
            providing user with access to data and resources; and
    a messaging application broker that:
        provides an interface between the application subsystem and the management subsystem;
        receives a message notification from the management subsystem that comprises a class of service lookup application used to verify the class of service wherein the management subsystem processes each type of message as a service;
        interacts with a presence server to verify presence and may forward the message to a mobile content management system which may be used by a wireline user computer to retrieve messages depending on the verified presence;
        provides a Gi interface between the messaging subsystem and user devices; and
        provides a public interface between the messaging subsystem and public external networks.

2. The system of claim 1, further comprising:
    a converged messaging system coupled to the messaging application broker wherein the messaging application broker sends instructions to the converged messaging system in at least one of a lightweight directory access protocol; an Internet message access protocol; or a simple mail transfer protocol.

3. The system of claim 1, wherein the management subsystem comprises at least one of:
    a network systems management component;
    a provisioning component; a network estimate component; or
    an operations administration and management component.

4. The system of claim 1, wherein the public external network is the Internet.

5. The system of claim 1, wherein the terminal interface comprises a Gi interface.

6. The system of claim 1, wherein said public interface connects the gateway to a public Internet server that converts speech to text.

7. A computer-readable storage medium that is not a propagating signal, the computer-readable storage medium comprising executable instructions that when executed by a processor cause the processor to effectuate operations comprising:
    storing a message from a first device in a converged messaging system, wherein the message is associated with a message type and is processed as a service;
    providing a message notification to a messaging application broker, wherein the message notification comprises a class of service lookup application used to verify the class of service, the messaging application broker having interfaces that interface:
        between the messaging application broker and at least one messaging application, wherein the at least one messaging application resides in an application subsystem comprising:
            an email application;
            an SMS application;
            a message waiting indicator application;
            a voice mail application;
            an MMS application;
            a visual voice mail application; and
            an instant messaging application;
        between the messaging application broker and at least one management application;
        between the messaging application broker and at least one user device; and
        between the messaging application broker and a public external mobile network;
    determining services available to a second device;
    selecting a network element from a plurality of network elements to provide a message notification to the second device based on the type of message and the services available to the second device;
    interacting with a presence server to verify presence of the second device and to forward the message to a mobile content management system which may be used by a wireline user computer to retrieve the message depending on the verified presence;
    delivering the message notification to the second device through the selected network element; and
    determining whether the message requires further processing.

8. The computer-readable storage medium of claim 7, wherein the plurality of network elements comprises a message waiting indicator server, a Gateway GPRS node, and a short messaging service center.

9. The computer-readable storage medium of claim 7, the operations further comprising:
receiving a message request from the second device through a second network element;
routing the message request to the messaging application broker; and
routing the message request from the messaging application broker to the converged messaging system.

10. The computer-readable storage medium claim 7, the operations further comprising:
transmitting the message from the converged messaging system to the messaging application broker;
transmitting the message from the messaging application broker to a second network element; and
transmitting the message from the second network element to the second device.

11. The computer-readable storage medium of claim 7, wherein the first network element is an MWI server when the message is a visual voicemail or a voice to text message.

12. A computer-readable storage medium that is not a propagating signal, the computer-readable storage medium comprising executable instructions that when executed by a processor cause the processor to effectuate operations comprising:
in a messaging application broker in a converged messaging system in the network having interfaces that interface:
between the messaging application broker and at least one messaging application, wherein the at least one messaging application resides in an application subsystem comprising:
an email application;
an SMS application;
a message waiting indicator application;
a voice mail application;
an MMS application;
a visual voice mail application; and
an instant messaging application;
between the messaging application broker and at least one management application;
between the messaging application broker and at least one user device; and
between the messaging application broker and a public external mobile network;
interfacing with at least one messaging application through the messaging application broker;
interfacing with at least one mobile network management application through the messaging application broker;
interfacing with at least one user device through the messaging application broker;
interfacing with at least one external mobile network through the messaging application broker;
interacting with a presence server to verify presence and to forward a message to a mobile content management system usable by a wireline user computer to retrieve messages depending on the verified presence;
receiving a message notification by the messaging application broker, wherein the message notification comprises a class of service lookup application used to verify the class of service associated with the message; and
delivering the message notification to the at least one user device through the public external network.

13. The computer-readable storage medium of claim 12, wherein the at least one messaging application comprises a converged messaging system.

14. The computer-readable storage medium of claim 12, wherein one of the plurality of external networks comprises a network that converts voice to text.

15. The computer-readable storage medium of claim 12, wherein one of the plurality of external networks comprises a carrier portal.

16. The computer-readable storage medium of claim 12, wherein one of the plurality of external networks comprises a mobile content management system.

17. The computer-readable storage medium of claim 12, wherein the at least one mobile management application comprises a provisioning system.

18. The computer-readable storage medium of claim 12, wherein the at least one messaging application comprises an SMS application.

19. The computer-readable storage medium of claim 12, wherein the at least one messaging application comprises a voicemail application.

* * * * *